(12) United States Patent
Kim et al.

(10) Patent No.: US 6,764,250 B2
(45) Date of Patent: Jul. 20, 2004

(54) METHOD OF LOAD REDUCTION ON BURIED CULVERT USING EPS BLOCK AND/OR GEOSYNTHETICS

(75) Inventors: Jin-man Kim, Kyunggi-do (KR); Sam-duck Cho, Kyunggi-do (KR); Ho-bi Kim, Kyunggi-do (KR); Sae-yong Oh, Kyunggi-do (KR); Bong-hyuk Choi, Kyunggi-do (KR); Tae-sung Ju, Kyunggi-do (KR); Jong-wha Rhee, Seoul-shi (KR)

(73) Assignees: Hanjin Heavy Industries & Construction Co., Ltd., Busan-Shi (KR); Korean Institute of Construction Technology, Kyunggi-Do (KR); Pyung San SI Ltd., Seoul-Shi (KR)

(*) Notice: Subject to any disclaimer, the term of this patent is extended or adjusted under 35 U.S.C. 154(b) by 0 days.

(21) Appl. No.: 10/307,254

(22) Filed: Nov. 29, 2002

(65) Prior Publication Data

US 2003/0219312 A1 Nov. 27, 2003

(30) Foreign Application Priority Data

May 22, 2002 (KR) .......................................... 2002-28507
May 22, 2002 (KR) .......................................... 2002-28509

(51) Int. Cl.$^7$ ................................................ F16L 57/00
(52) U.S. Cl. ........................................ 405/157; 405/124
(58) Field of Search .............................. 405/157, 124, 405/125, 126

(56) References Cited

U.S. PATENT DOCUMENTS

| | | | | | |
|---|---|---|---|---|---|
| 1,588,897 | A | * | 6/1926 | Marston | 405/124 |
| 3,807,183 | A | * | 4/1974 | Wolff | 405/157 |
| 4,119,751 | A | * | 10/1978 | Nilsson et al. | 405/157 |
| 5,326,191 | A | | 7/1994 | Wilson et al. | |
| 5,713,696 | A | * | 2/1998 | Horvath et al. | 405/45 |
| 5,765,967 | A | * | 6/1998 | Klaymar | 405/179 |

OTHER PUBLICATIONS

Horvath, John S. "The Compressible–Inclusion Function of EPS Geofoam: An Overview of Concepts, Applications, and Products," Mar. 1998, pp. 71–81.*
Horvath, John S., "Geofoam Geosythetic: Past, Present, and Future," 1996.*
Horvath, John S. "The Compressible–Inclusion Function of EPS Geofoam: Analysis and Design Methodologies," Apr. 1998, pp. 77–120.*
Kim et al., "Research of Load Reduction on Conduits Using Geosynthetics," Geosynthetics Conference, Nov. 30, 2001, 233–242.
Vaslestad et al., "Load Reduction on Rigid Culverts Beneath High Fills. Long Term Behaviour," Norwegian Road Research Laboratory, Publication No. 74, 25–35.

* cited by examiner

Primary Examiner—Frederick L. Legman
(74) Attorney, Agent, or Firm—Beyer Weaver & Thomas, LLP

(57) ABSTRACT

A method of load reduction on buried culvert using an EPS block is disclosed. A culvert foundation is constructed at a place where a culvert will be buried, and the culvert is put on the foundation, and then, both sides of the culvert are banked with filling earth. EPS blocks are paved in multiple layers on the top surface of the culvert, or geosynthetics and an ESP block are paved on the culvert, and then, filling earth is banked on the geosynthetics or the ESP block and a final ground level is compacted. As a result, compression occurs from the EPS block, deformation of the inside earth is caused artificially, and arching is generated. Accordingly, the method has vertical earth pressure reduction effect, thereby preventing an increase in the section of the culvert due to overburden of the banked earth and an increase in vertical load due to a settlement amount of the culvert buried on the weak ground and a relative settlement difference of surrounding earth, and improving durability of the buried culvert.

3 Claims, 10 Drawing Sheets

METHOD OF LOAD REDUCTION ON BURIED CULVERT USING EPS BLOCK AND/OR GEOSYNTHETICS

BACKGROUND OF THE INVENTION

1. Field of the Invention

The present invention relates to a method of load reduction on a buried culvert using an EPS block, and more particularly, to a method of load reduction on buried culvert using an EPS block, in which the EPS block is placed in the form of a multi-layered structure or the EPS block and geosynthetics are placed to maximize an earth arching effect due to artificial compression and deformation of EPS blocks and earth pressure reduction due to progress of deformation and maximize an arching effect because of pull-out resistance of earth and geosynthetics occurring when the EPS blocks are compressed in case of geosynthetics, thereby preventing an increase of culvert section due to high fill and an increase of vertical load due to a relative settlement difference of surrounding earth, which occurs from buried culvert on the weak ground.

2. Background of the Related Art

In general, a culvert, which is a structure buried underground or road embankment, is a water flow channel, or which is covered not to show water surface on the surface of the earth. In case that the culvert is applied to engineering works, it forms a channel for rainwater, sewage and water for industrial and agricultural uses or is used to make a passage, such as a footway or a roadway. Also, it may be used in an underground common duct for burying electric communication and hot and cool culverts.

The culvert is divided into a rigid pipe, a semi-rigid or a soft according to rigidity of material. The rigid type culvert is used as a concrete pipe and a cast iron pipe. The soft type culvert is made of steel material, and the section of the pipe is in the form of a round, a rectangle, an egg, or an oval circle.

Meanwhile, the culvert constructed under the road serves to transmit high filling of a road embankment and vehicle load to the ground, and to allow small vehicles and people who want to cross a road to pass below the road. Therefore, the culvert requires characteristics capable of sufficiently supporting equally distributed loads by a banking load and a traffic load as an underground structure and preventing ground settlement.

Furthermore, the culvert is classified according to used materials, sectional shape and construction methods. The reason is that a load acting on the culvert is varied according to buried methods of the culvert.

The culvert is classified into a ditch condition, a projecting condition and a tunnel condition according to the construction methods.

The ditch condition means that a trench is formed in a burial depth and the culvert is buried, the projection condition means that the culvert is put on the original ground surface and filling earth is banked on lateral sides and the top surface of the culvert, and the tunnel state means that the ground is directly tunneled by tunneling methods of various kinds and the culvert is installed.

The most important load acting on the culvert is gravity.

A formula for calculating a load acting on the culvert is expressed only by the vertical element, and the horizontal element is determined according to the ratio of the load of the calculated vertical element.

The load acting on the culvert includes the following matters:

first, a load of a downward force vector acting on the upper plane of the culvert; and second, a resultant force vector of a base reaction force acting on the lower plane of the culvert upwardly.

At this time, the upward base reaction force has the same value as a total load acting downwardly if a foundation of culvert to withstand the total upward force is sufficient.

The load acting on the culvert is largely classified into two: first, a load by surroundings of the culvert and filling material of the top surface; and second, a overburden pressure in which load generated from the outside is transmitted through the filling material.

At this time, the overburden pressure acts as a concentrated load if being equal to a truck-axial load, and acts as a distribution load if construction materials are piled up on the filling material.

A vertical load of the culvert is calculated as follows (guide book of embankment & culvert temporary structure construction (1986), issued by Japanese Road Association—Korea applies the same standards):

$$P = \alpha \Gamma H$$

wherein P is vertical load, $\alpha$ is a load coefficient, $\Gamma$ is a unit weight of filling material, and H is overburden of the upper plane of culvert.

At this time, $\alpha$ has the following value:

1) if the foundation ground is good and a pile foundation is not used, $\alpha$ is 1.0.

2) if a box type culvert is constructed on the weak ground,

| H/B | Less than 1 | 1~2 | 2~3 |
|---|---|---|---|
| $\alpha$ | 1.0 | 1.2 | 1.35 | wherein B is a horizontal breadth of a culvert.

As described above, the load acting on the upper part of the culvert is larger than a self-weight of the upper filling material, $\Gamma H$. The reason is that not only the self-weight of the upper filling material but also downward shear force between the interior prism and the exterior prism are added and act on the top surface of the culvert. Lots of search results carried out in the U.S show the above fact, and many regions in Japan and Korea adapts it as a standard.

Furthermore, damage of the culvert occurs when exact analysis and consideration of differential settlement between a direct upper part and a side part of the culvert, i.e., an additional load according to relative deformation, a stress concentration phenomena of connected parts, differential settlement of culvert foundation are not reflected in design, and construction methods and management of quality suitable for field conditions are not managed according to proper standards. So, effective supplementations to the above have been demanded.

An induced ditch culvert is manufactured to reduce the vertical load acting on the upper part of the culvert. The induced culvert is manufactured by performing the steps of constructing the culvert like a forward projecting culvert, excavating to a horizontal volume of the culvert and the top surface of the culvert after filling material is banked on the side and upper parts of the culvert, and banking again with very smooth and compressible material. At this time, straws, bales of hay or organic earth were filled as the filling material. However, their stress-strain behaviors is unpredictable and uncontrollable and it can result in a potential explosion hazard as a result of the methane gas generation that accompanies anaerobic decomposition of organic material in a confined space.

Therefore, instead of using the straws, haystacks or organic earth, which are compressible materials, a method for placing an EPS on the top surface of the buried culvert has been used to reduce the horizontal and vertical loads applied to the buried culvert.

The EPS (Expanded Polystyrene) block is called Styrofoam, and called foamed styrene in the industrial field. The EPS is made by performing the steps of adding foaming agent to polystyrene resin of a grain type, foaming gas at the same time with heating and softening.

The EPS block first applied as engineering material by the Norwegian Road Research Laboratory (NRRL) on 1972 has been verified as a lightweight fill material for geotechnical engineering for 30 years.

An EPS banking refers to a method applied to engineering and construction works, such as roads embankment, railways and land preparation, using a large-sized EPS block as banking material and filling material because the EPS block has super-lightness, compression resistance, water resistance, independence.

FIG. 1 is a schematic view of the structure of a construction section of a conventional buried culvert. As shown in the drawing, foundation excavation was performed at a place, where a culvert will be buried. Land grading was performed at the ground of the excavated place, and after that, mat and rubble stones were placed and the culvert 1 was put. After that, material was filled directly. Alternatively, an EPS block 2 was placed before the filling earth was banked, and the EPS block 2 was placed, and then, filling earth was banked and compacted to be equal to a required elevation.

Total stress W' acting on the top surface of the culvert 1 is calculated as follows:

if the EPS block 2 is not placed, W'=W=P=$\alpha\gamma$H (wherein W is a self-weight of filling earth, $\alpha$ is 1.0~1.6, $\gamma$ is a unit weight of filling earth, and H is overburden of the upper plane of a culvert), and if the EPS block 2 is placed, W'=W−2F (wherein F is a friction force induced by compression of EPS block).

If the culvert 1 is buried in a state that the EPS block is not placed, it is highly possible that the culvert is damaged. Such damage of the culvert may cause stress concentration of culvert connecting parts and non-uniform settlement of culvert foundation. Even though the EPS block is placed to prevent the above problems, there is a problem that the greatest vertical earth pressure reduction is not obtained when a largely vertical load is acted.

SUMMARY OF THE INVENTION

Accordingly, the present invention is directed to a method of load reduction on buried culvert using EPS blocks that substantially obviates one or more problems due to limitations and disadvantages of the related art.

An object of the present invention is to provide a method of load reduction on a buried culvert utilizing compressibility of an EPS block, which is used as a filler upon a road construction and an abutment construction, thereby preventing an increase in the section of the culvert due to banking and an increase in a vertical load due to a relative settlement difference of surrounding earth of the buried culvert on the weak ground.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an EPS block is placed in the form of a multi-layered structure between filling earth while filling earth is banked on the top surface of a culvert, which is buried, wherein the upper EPS block is placed on a plane of equal settlement.

In another aspect of the present invention, the EPS block is placed on the top surface of the culvert, and geosynthetics is placed on the EPS block.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

First, a first preferred embodiment will be described referring to FIGS. 2 to 7.

Figure 1:
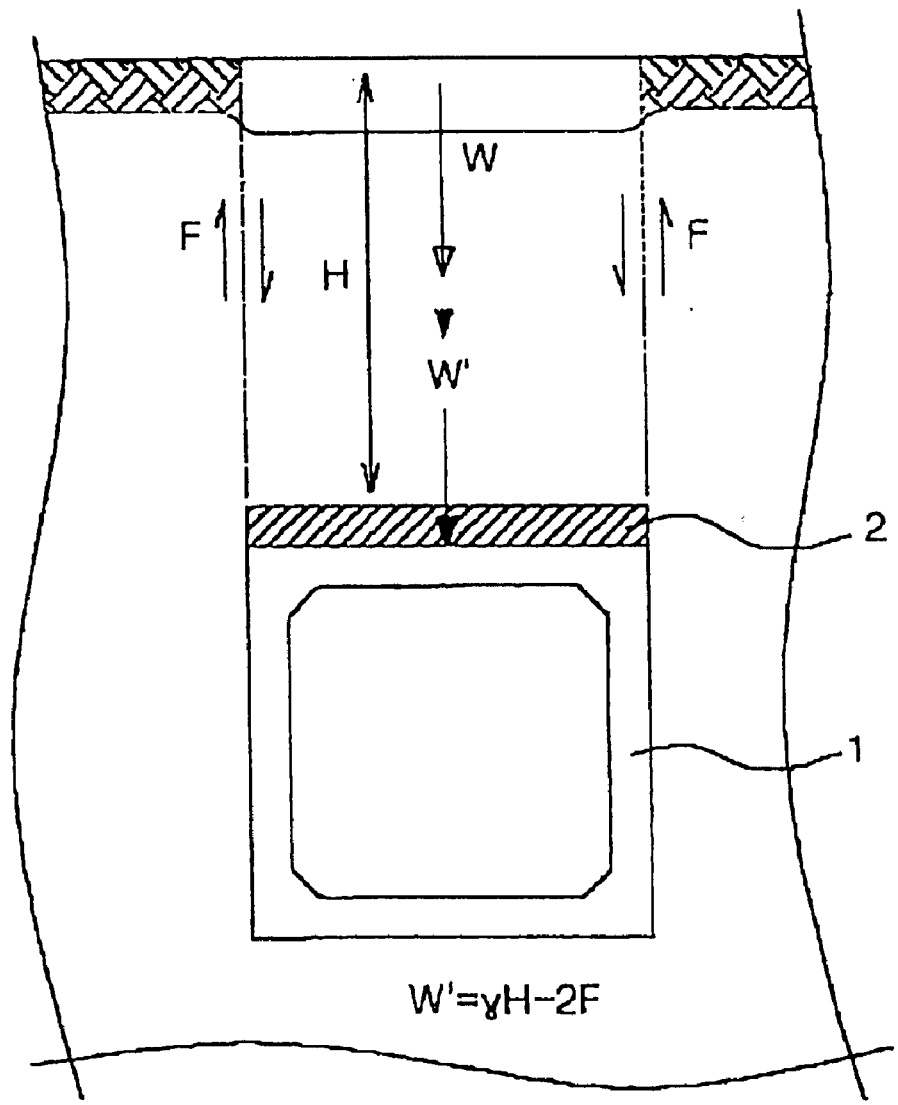
FIG. 1 is a schematic view of the structure of a construction section of a conventional buried culvert.
Figure 2:
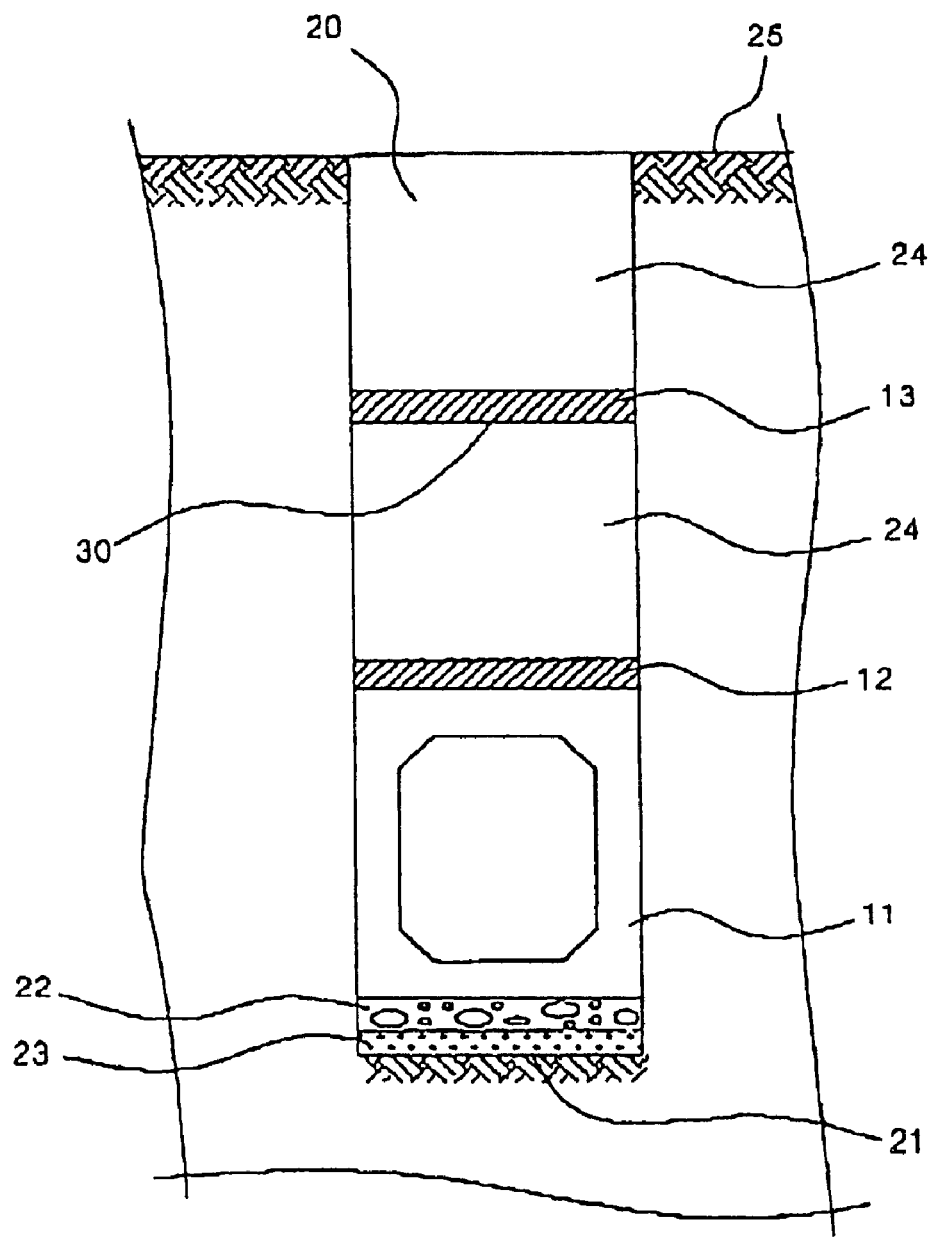
FIG. 2 is a schematic view illustrating the structure of a construction section of a buried culvert according to a first preferred embodiment of the present invention.
Figure 3:
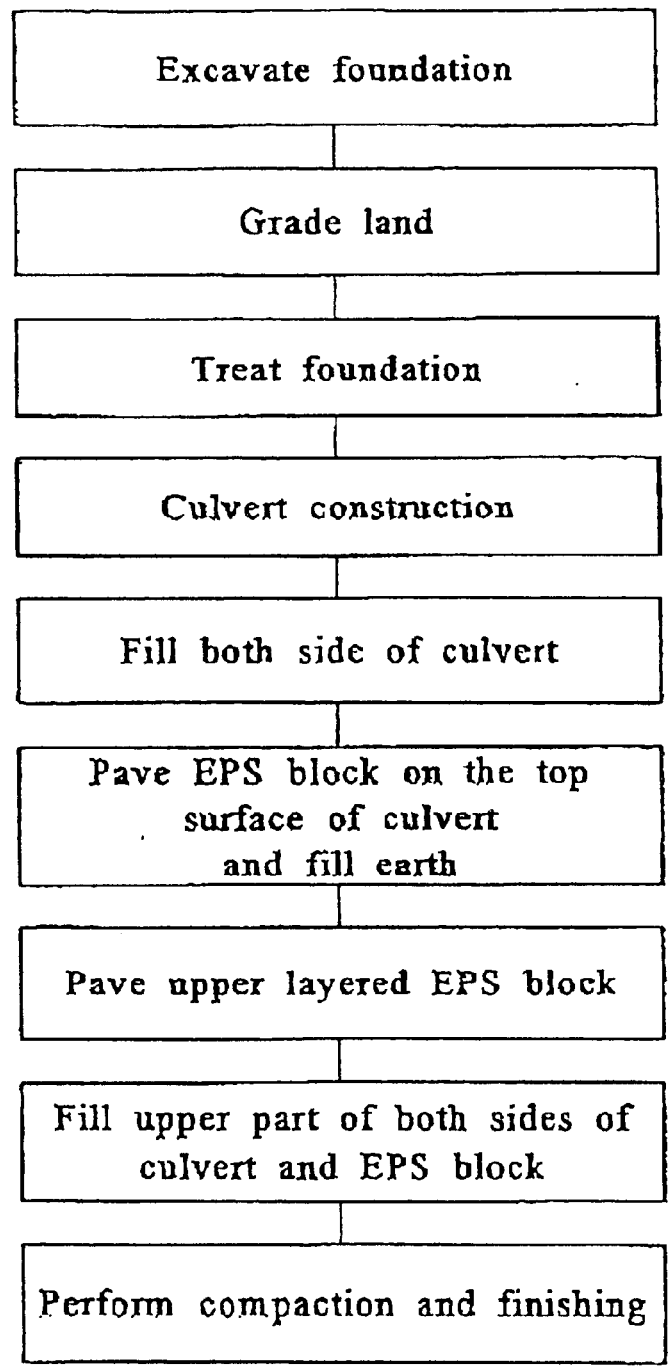
FIG. 3 is a flow chart illustrating construction process of the buried culvert according to the first embodiment of the present invention.

FIG. 2 is a schematic view illustrating the structure of a construction section of a buried culvert according to a first preferred embodiment of the present invention, and FIG. 3 is a flow chart illustrating construction process of the buried culvert according to the first embodiment of the present invention.

As shown in the drawings, foundation excavation is performed at a place 20, where a culvert 11 will be buried. Land grading is performed at excavated earth 21, and after that, a mat 22 and rubble stones 23 are placed for foundation treatment. Subsequently, the culvert 11 is put on the mat 22, and then, an EPS block 12 is placed on the top surface of the culvert 11, and filling earth 24 is banked on the placed EOS block 12. After that, an EPS block 13 is placed again on the banked filling earth, filling earth 24 is banked on the placed EOS block 13 and compacted to be equal to a final ground level 25.

That is, since the EPS block 12 is located on the culvert 11, the bottom surface of the EOS block 12 is in contact with the top surface of the culvert 11, and the top surface of the EPS block 12 is in contact with the filling earth 24. The additionally placed EPS block 13 is in contact with the filling earth 24 at the to and bottom surfaces thereof.

As described above, when the EPS blocks 12 and 13 are placed in multiple layers, it is preferable that the EPS block 13 placed at the upper area is placed on a plane of equal settlement 30 of the filling earth 24 which is banked on the EPS block 12.

That is, when the EPS block 12 is placed on the top surface of the culvert 11 and the filling earth 24 is filled on the top surface of the EPS block 12, the EPS block 12 causes artificial compression and deformation due to a vertical load of the filling earth 24, and so, earth pressure reduction due to an arching effect of earth and deformation progress arises while the banked filling earth 24 is partly settled downwardly. At this time, when the banked earth reaches a predetermined height, a plane where the filling earth 24 is no longer settled, i.e., a plane where an amount of settlement occurring by the EPS block as compressible material is 0 exists, and the plane is called the plane of equal settlement 30.

Figure 4:
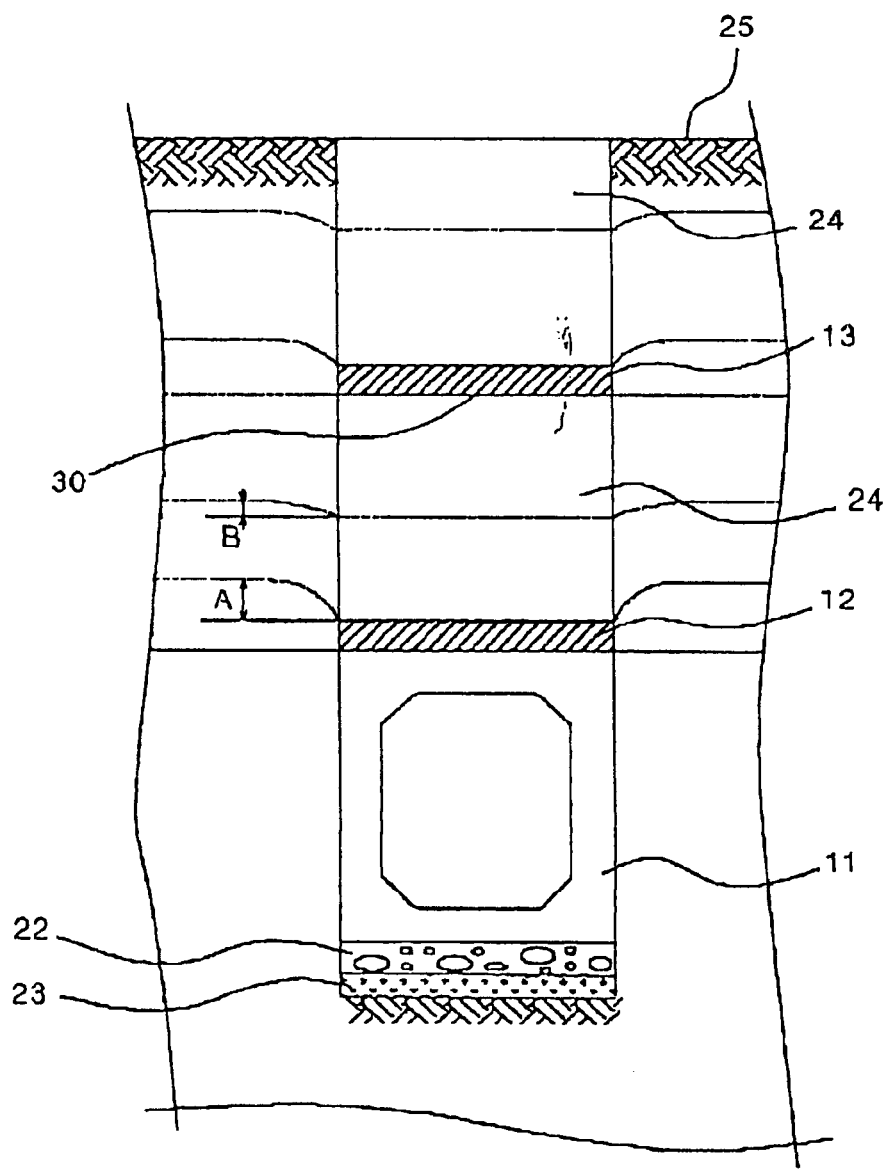
FIG. 4 is a briefly sectional view illustrating the plane of equal settlement on the buried culvert according to the present invention.

FIG. 4 is a schematic sectional view illustrating the plane of equal settlement, and in the drawing, dotted lines denote settled plane surfaces.

That is, the filling earth 24 near the place with which the top surface of the EPS block 12 is in contact is settled as much as the EPS block 12 is compressed However, settled height B is reduced gradually in an upward direction, and the filling earth becomes equal to surround earth at a predetermined height.

That is, it can be seen that also on the top surface of the EPS block 12, the plane of equal settlement 30 exists at the predetermined height. The EPS block 13 is additionally placed on the plane of equal settlement 30.

Figure 5:
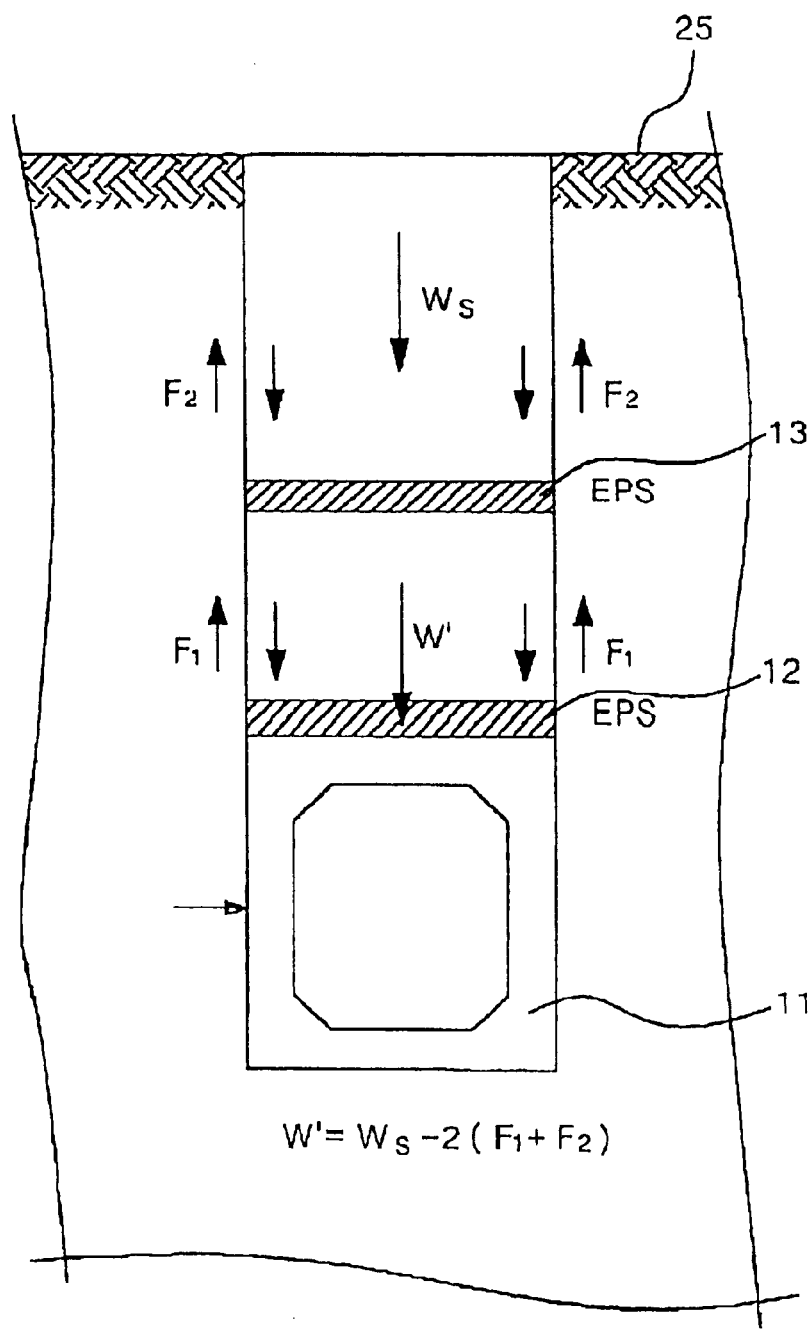
FIG. 5 is a schematic view illustrating a related earth pressure occurring from the buried culvert according to the present invention.

FIG. 5 is a schematic view illustrating related earth pressure occurring from the buried culvert according to the present invention. The filling earth 24 applies its weight to the top surface of the culvert 11. The weight of the earth body acting on the top surface of the culvert is designated as $W_s$, and a total stress acting on the top surface of the culvert 11 is designated as W'.

Namely, power $F_1$ acting against an arching effect of earth due to the artificial compression and deformation of the EPS block 12 is upwardly generated from the top surface of the EPS block 12 in the opposite direction of earth self-weight $W_s$, and Power $F_2$ acting against an arching effect of earth due to the artificial compression and deformation of the EPS block 13 placed on the upper layer is upwardly generated from the top surface of the EPS block 12 in the opposite direction of earth self-weight $W_s$. Moreover, the total stress W' acting on the top surface of the culvert 11 is written as follows:

$$W'=W_s-2(F_1+F_2).$$

That is, the EPS blocks 12 and 13 can reduce vertical earth pressure acting on the culvert 11.

Figure 6:
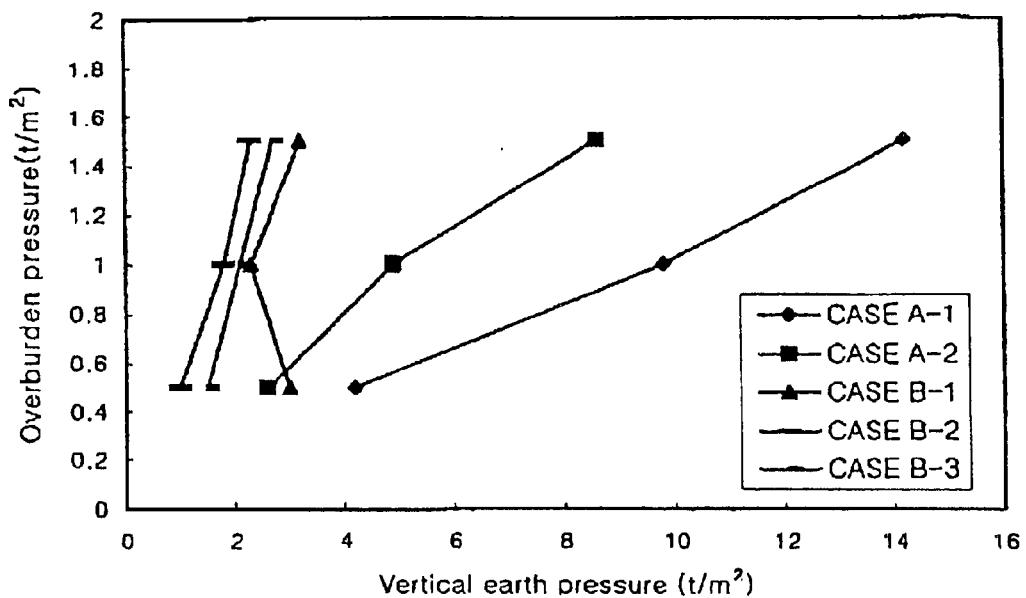
FIG. 6 is a graph illustrating relationship between a vertical earth pressure and a vertical load according to a change in a width of the placed EPS.
Figure 7:
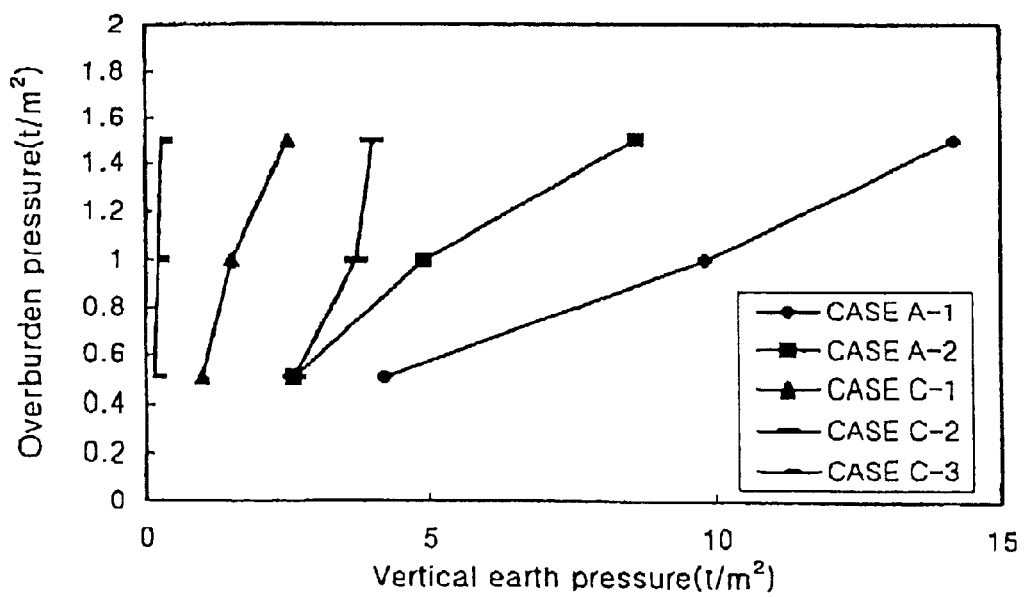
FIG. 7 is a graph illustrating relationship between a vertical earth pressure and a overburden pressure according to a change in intervals of the placed EPS blocks.

FIG. 6 is a graph of relationship between the vertical earth pressure and the overburden pressure according to a change in a width of the placed EPS, and FIG. 7 is a graph of relationship between the vertical earth pressure and the overburden pressure according to a change in intervals of the placed EPS blocks when the EPS blocks are placed in multiple layers.

The overburden pressure referrs loads of all types applied to the ground excepting a load due to self-weight of earth. In FIG. 6, CASE A-1 shows earth pressure measured at the ground where the culvert is not buried, and CASE A-2 shows earth pressure measured at the ground where only the earth is buried. It would be appreciated that the vertical earth pressure (overburden) is generally increased linearly by self-weight of banked earth.

In CASE B-1, a width of the placed EPS block is equal to the width of the culvert (1.0D, D=width of culvert), in CASE B-2, 1.5D, and in CASE B-3, 2.1 D. In a load value of 15 t/m², vertical load is 3.2 t/m² in 1.0D, 2.3 t/m² in 1.5D, 2.7 t/m² in 2.1D.

FIG. 7 shows a value measured in state that the width of the placed EPS block, 1.0D(D=width of earth) is equal to that of the earth. Especially, it shows load reduction of the top surface of culvert using the EPS block or organic clay of high compressibility as induced trench type buried culvert compressing material. At this time, an arching area of the top surface of the induced trench type culvert where compressible deformation occurs ranges from the top surface of the culvert to the plane of equal settlement (the plane where the amount of settlement occurring by compressible material is 0). That is, this means that the induced trench type culvert generates shear force F, which is generated at both boundary surfaces of inner and outer earth bodies used for load reduction, from the top surface of the culvert to the plane of equal settlement on vertical plane. Therefore, the placing of multiple layered EPS blocks induce load reduction by placing an EPS block on the plane of equal settlement (where a degree of settlement is 0) and expanding the arching area vertically.

Namely, after the width of the placed EPS block is fixed to 1.0D, the earth pressure reduction was measured while vertical interval of the placed EPS was changed to 1.0D (CASE C-1), 1.2D(CASE C-2) and 1.5D(CASE C-3) with respect to the diameter of the culvert. The load reduction effect according to the change in the interval of the placed EPS is the largest at 1.0D, the vertical interval of double layered EPS, and is reduced gradually as the interval is far away from the EPS disposed on the culvert. For example, the vertical load according to the change in interval of the placed EPS is 2.5 t/m² in 1.0D, 3.3 t/m² in 1.2D and 4.0 t/m² in 1.5D, in the load stage of 15 t/m², which shows reduction effects of 71%, 62% and 53%, respectively, as compared to CASE A-1 of 8.6 t/m². Moreover, compared with CASE B-1, the load reduction effect is 3.2 t/m² in case of the placing of a single layered EPS and 2.5 t/m² in case of the placing of double layered EPS and 1.0D, which is increased additionally to about 22%.

In the embodiment of the present invention, the additional EPS block is placed in the single layer to make the EPS blocks placed in double layers, but it would be appreciated that the EPS blocks may be placed in multiple layers according to the depth of the buried culvert. However, it is rare that the culvert is buried very deeply. So, even the EPS blocks placed in double layers can achieve the load reduction effect explained in the present invention.

When artificial compression is applied to banked earth after the EPS block is placed (test result) to be the same width as horizontal width of the culvert on the plane of equal settlement, which may differ in depth according to construction conditions, shear force occurring from the upper earth is changed from the downward direction to the upward direction. At this time, an amount of compression required for the EPS block is somewhat larger than settlement difference between the culvert and surrounding earth. In a real construction site, even a very small amount of compression at the level which has no influence on stability of structure can show an excellent vertical load reduction effect. In the case where the level of the banked earth of the top surface of the culvert is high, a depth at which a downward shear force occurs is below the level of the banked earth (the plane of a final banked earth). This means that the plane of equal settlement exists inside the banked earth. At this time, an EPS block is additionally placed on the plane of equal settlement inside the banked earth, so that a shear force acting on the side surface of the earth above the plane of equal settlement is induced in the upward direction and self-weight of earth acting on the top surface of the culvert is reduced. In fact, such technique can be satisfied by placing the EPS blocks in double layers in consideration of the height of the banked earth of 15 m.

A second embodiment of the present invention will now be described hereinafter with reference to FIGS. 8 AND 9.

Figure 8:
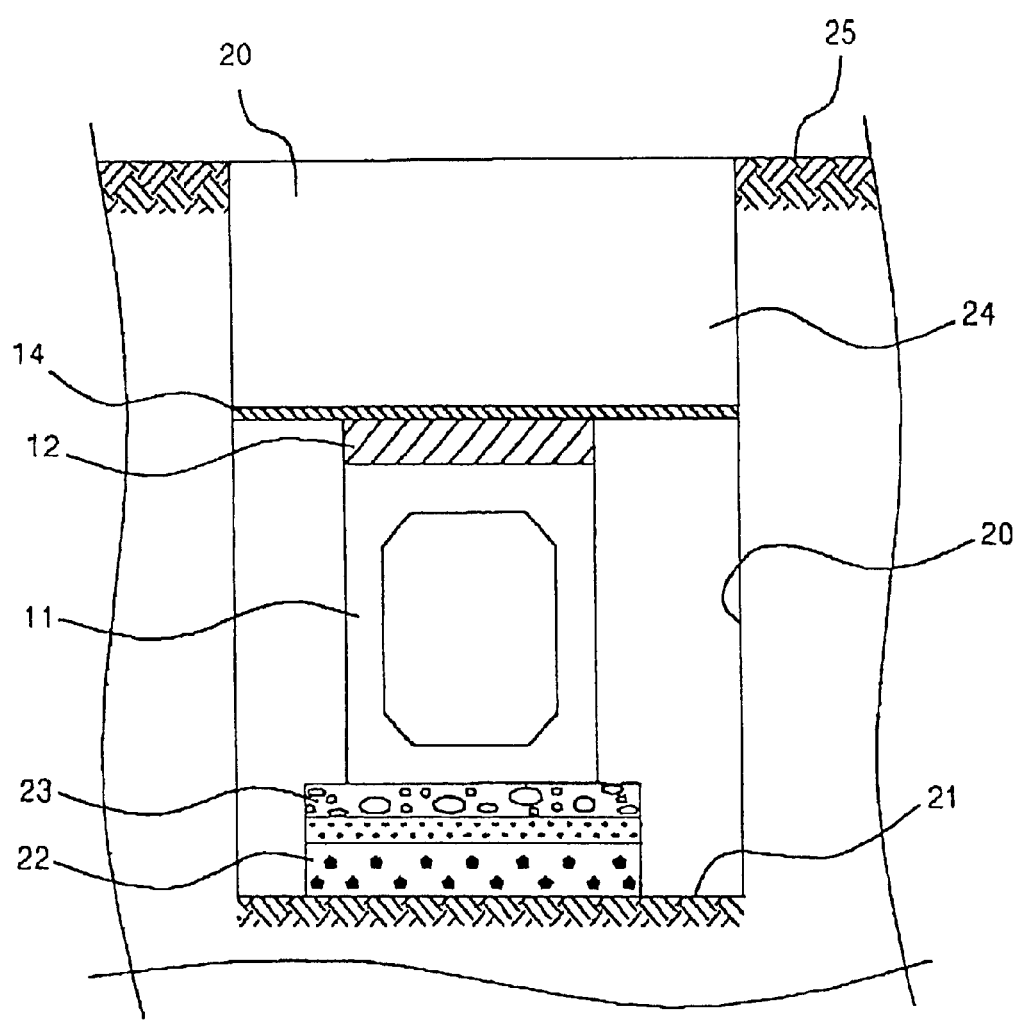
FIG. 8 is a schematic view illustrating the structure of a construction section of a buried culvert according to a second preferred embodiment of the present invention.
Figure 9:
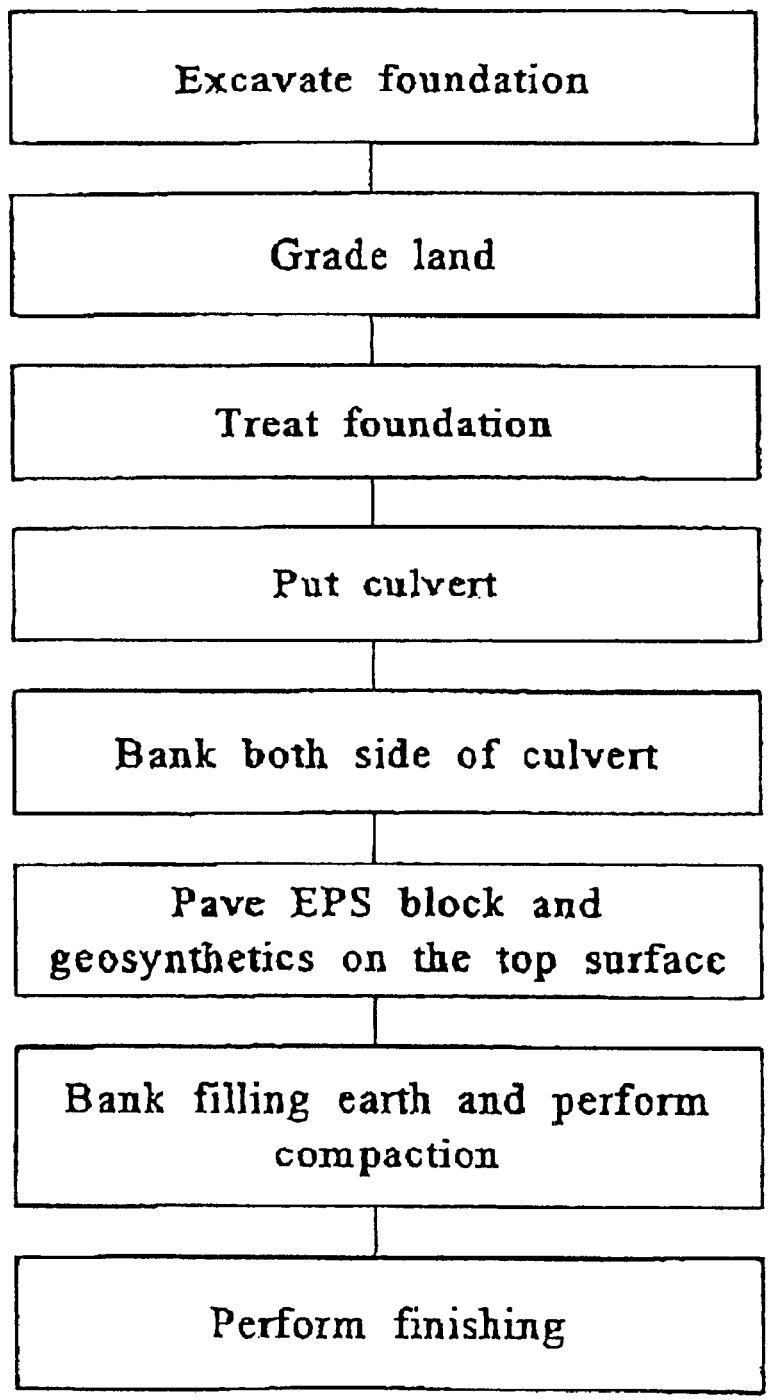
FIG. 9 is a flow chart illustrating construction process of the buried culvert according to the second embodiment of the present invention.

FIG. 8 is a schematic view illustrating a construction section of the buried culvert, and FIG. 9 is a flow chart illustrating the construction process of buried culvert according to the second embodiment of the present invention.

As shown in the drawings, first, foundation excavation is performed at a place 20, where a culvert 11 will be buried. Land grading is performed at excavated earth 21, and after that, a mat 22 and rubble stones 23 are placed for foundation preparation. The culvert 11 is put on the rubble stones 23, and then, an EPS block 12 is placed on the top surface of the culvert 11 and geosynthetics 14 is placed on the EPS 12. Then, filling earth 24 is banked on the geosynthetics 14 and compacted to be equal to a final ground level 25.

As described above, when the EPS block 12 and the geosynthetics 14 are placed, the EPS block 12 arises compressible deformation by a vertical load of the filling earth 24 and causes artificial deformation inside the banked earth, thereby, an arching effect of earth and earth pressure reduction due to deformation progress are realized. The geosynthetics 14 is partly settled downwardly according to the artificial compression. At this time, the ends 14' of the geosynthetics 14 buried between filling earth 24 are downwardly moved together with the EPS block 12. As a result, pull-out resistance occurs in the geosynthetics 14 moving downwardly, thereby, the arching effect of surrounding earth of the culvert 11 is maximized so as to effectively reduce vertical load applied to the buried culvert.

Figure 10:
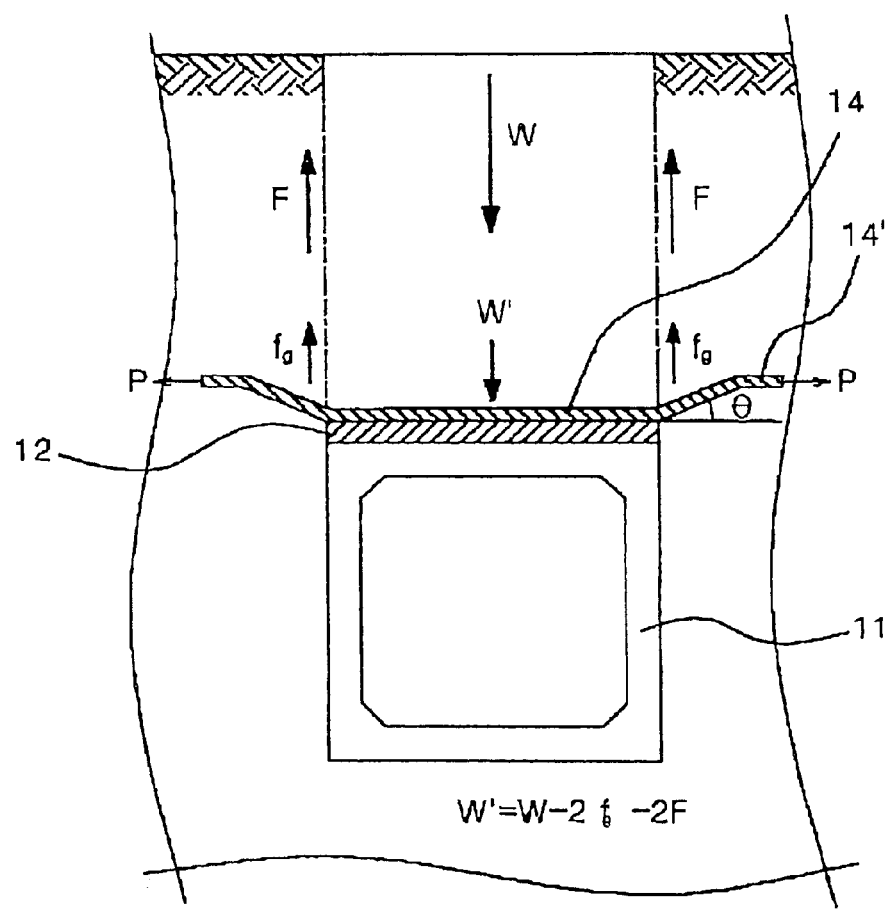
FIG. 10 is a schematic view illustrating a related earth pressure occurring from the buried culvert according to the second embodiment of the present invention.

FIG. 10 is a schematic view illustrating a related earth pressure according to the second embodiment of the present invention. The banked earth 24 applies its weight to the top surface of the culvert 11. The self-weight of earth acting on the top surface of the culvert is designated as W, and real total stress acting on the top surface of the culvert 11 is designated as W'.

Power F acting by the arching of earth due to the artificial compression and deformation of the EPS block 12 is generated from the end of the EPS block 12 in the opposite direction of the earth self-weight W, and the pull-out resistance P of the geosynthetics 14 is generated in the lateral direction toward the outside of the culvert 11. The pull-out resistance P of the geosynthetics 14 is designated as $f_g$ since it is resistance to deformation progress of earth on the culvert. At this time, real total stress W' acting on the top surface of the culvert 11 is written as follows:

$$W'=W-2F_g-2F$$

where F is defined by an arching effect due to compression of the EPS block. That is, the EPS block 12 and the geosynthetics 14 can effectively reduce vertical earth pressure acting on the culvert 11.

Figure 11:
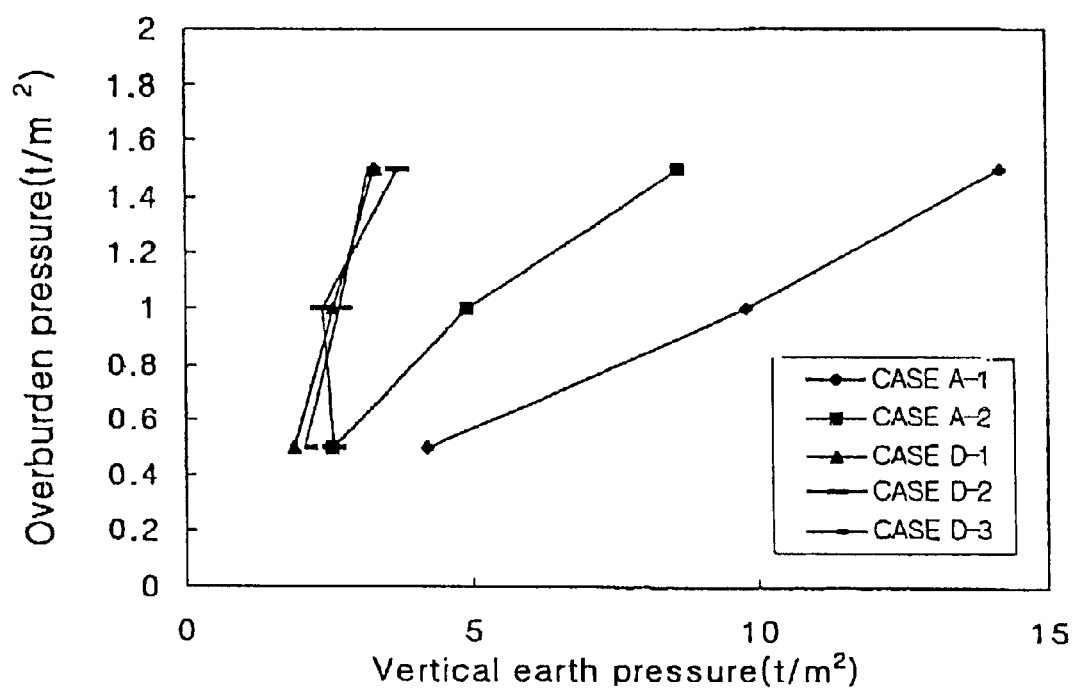
FIG. 11 is a graph illustrating relationship between a vertical earth pressure and a vertical load according to the second embodiment of the present invention.

As shown in FIG. 6, in the banked earth, vertical earth pressure (overburden) is increased linearly by self-weight of filling material. Referring to FIG. 11, the relationship between vertical earth pressure and overburden pressure according to a change in the width of the placed geosynthetics (geogrid) will now be described.

At this time, the density of the EPS block uses D-15(15 kg/cm³) and D-20, and the geosynthetics uses geogrid or geotextile.

FIG. 11 shows a graph illustrating vertical earth pressure reduction measured by changing the width of the placed geosynthetics into 0.5D(CASE D-1), 0.75D(CASE D-2) and 1.0D(CASE D-3) with respect to the culvert after fixing the width of the placed EPS block to be equal to that of the culvert (1.0D, D=width of culvert).

When artificial compression is applied to earth after the EPS block is placed(test result) to be the same width as horizontal width of the culvert on the plane of equal settlement, which may differ in depth according to construction conditions, shear force occurring at the upper earth is changed from the downward direction to the upward direction. At this time, the amount of compression required for the EPS block is somewhat larger than a settlement difference between the culvert and surrounding ground. If the EPS block is placed on general earth ground but not the weak ground, even a very small amount of compression can exhibit an excellent vertical load reduction effect. Because compression of the EPS block occurs and pull-out occurs at settled depth parts of both sides of the geosynthetics placed on the top surface of the EPS block, a load to be acted on the culvert later is partly reduced by self-weight of earth on the culvert and external load.

As shown in FIG. 11, a load is 3.3 t/m² when the width of the placed geosynthetics is 0.5D(CASE D-1) at a vertical load of 15 t/m², 3.7 t/m² when it is 0.75D(CASE D-2), and 3.2 t/m² when it is 1.0D(CASE D-3). It is expected that earth pressure reduction effect is increased by 62%, 57% and 63% as compared to CASE A-1 of 8.6 t/m².

As described above, the present invention has advantages in that the EPS block are placed in multiple layers on a culvert or the EPS block and the geosynthetics are placed on the culvert, so that it is applied to culvert structures for connection paths of the general roads and railroads, irrigation and supply of water on the weak ground, communication lines for transmission and reception, subway lines and underground roads, and causes artificial compression and deformation of the EPS block to show arching effect of earth and earth pressure reduction according to deformation progress. Because vertical earth pressure is reduced by maximizing the arching of surrounding earth of the structures, the increase in the section of the culvert due to the banking of earth and the increase in the vertical load due to a relative settlement difference of surrounding earth of the buried culvert on the weak ground are prevented, so that a vertical load on the buried culvert can be effectively reduced in a stable condition.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of load reduction on a buried culvert using an EPS block, comprising the steps of:

placing an EPS block on the top surface of the buried culvert;

banking filling earth on the placed EPS block;

additionally placing an EPS block on the banked filling earth, wherein the additional placed on a plane of equal settlement; and banking filling earth on the additionally placed EPS block, thereby forming a multi-layered EPS block embedded in the banked filling earth.

2. The method according to claim 1, wherein a vertical interval of the additionally placed EPS block is 0.7 to 1.5D (D=width of culvert).

3. A method of load reduction on a buried culvert using geosynthetics and an EPS block, comprising the steps of:

placing an EPS block on the top surface of the buried culvert;

placing geosynthetics on the placed EPS block; and banking filling earth on the placed geosynthetics.

* * * * *